UNITED STATES PATENT OFFICE.

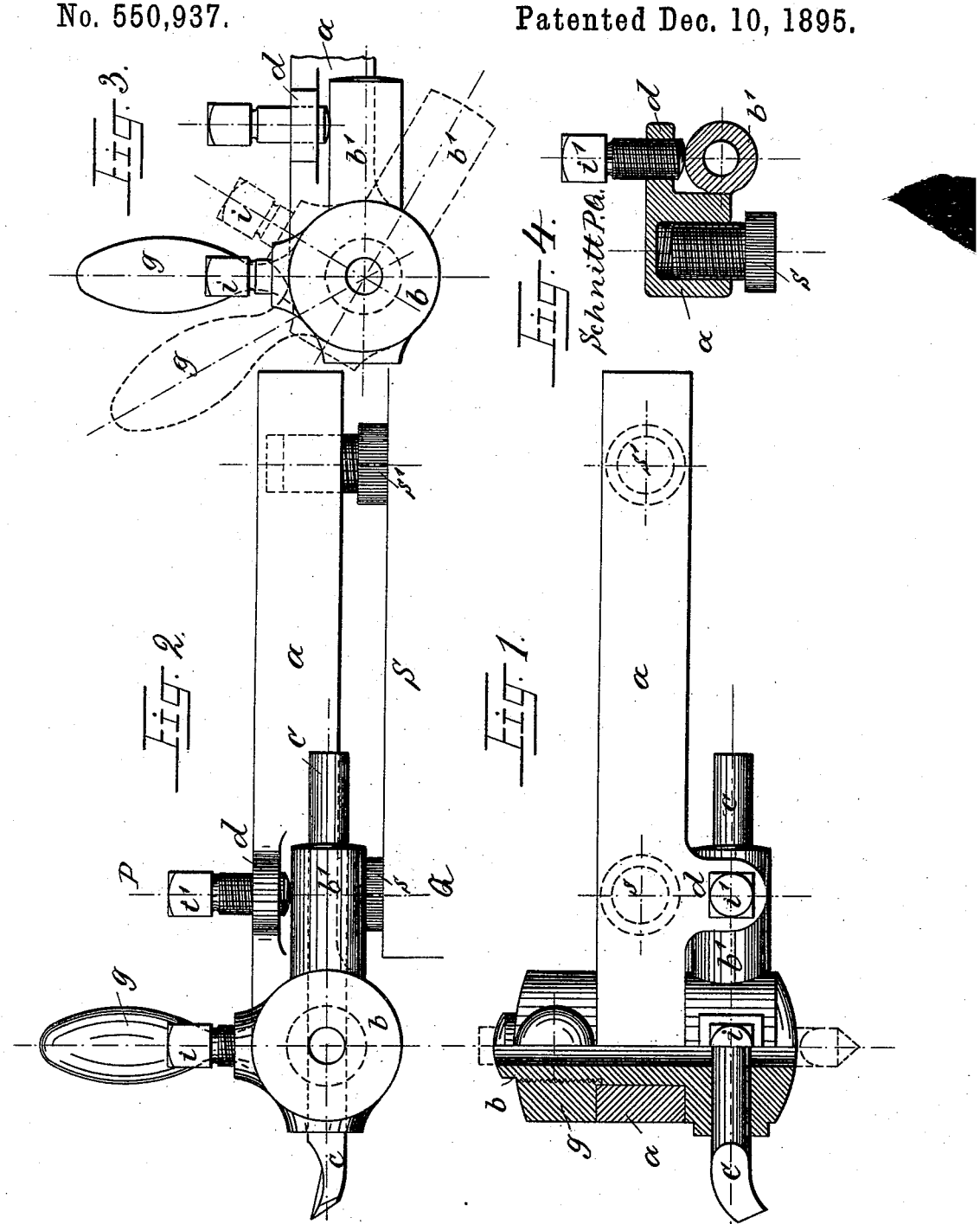

KARL BAUER, OF PFULLINGEN, GERMANY.

TOOL-REST FOR LATHE-TOOLS.

SPECIFICATION forming part of Letters Patent No. 550,937, dated December 10, 1895.

Application filed July 22, 1895. Serial No. 556,815. (No model.) Patented in Germany October 25, 1892, No. 69,682; in Switzerland October 27, 1892, No. 5,751, and in Belgium January 4, 1894, No. 108,190.

*To all whom it may concern:*

Be it known that I, KARL BAUER, a subject of the King of Würtemberg, residing at Pfullingen, in the Kingdom of Würtemberg, Germany, have invented certain new and useful Improvements in Tool-Rests for Lathe-Tools, (for which I have obtained foreign patents in Germany, No. 69,682, dated October 25, 1892; in Switzerland, No. 5,751, dated October 27, 1892, and in Belgium, No. 108,190, dated January 4, 1894;) and I do hereby declare the following to be a full, clear, and exact description of the invention, such as will enable others skilled in the art to which it appertains to make and use the same.

The object of the present invention is a tool-rest enabling the operator to turn down articles to be produced in great numbers on a lathe to a diameter of perfect uniformity and enabling the tool to be always placed in exactly the same position.

This tool-rest can be employed equally well for the work on all kinds of metals. The tools can be placed in it in various manners, so that it is easy to use it for different work—such as turning out holes, cutting inner or outer threads, &c.

Figure 1 of the accompanying drawings shows the tool-rest in a plan view partly in section. Fig. 2 is a side elevation. Fig. 3 is a side elevation of the front part with open and closed handles for clamping the tool-rest. Fig. 4 is a cross-section on line P Q, Fig. 2.

The tool-rest consists of a piece of iron, steel, or other metal having a rectangular cross-section $a$, which is secured to the ordinary slide-rest of the lathe in any convenient manner. The front end of this piece or carrier $a$, projecting beyond the slide-rest toward the work, is provided with a cylindrical bore, wherein a sleeve $b$ is placed, being provided with means to be firmly clamped therein. Said sleeve $b$ is centrally perforated, and so is also a lateral projection or side sleeve $b'$, with which it is provided for the purpose of receiving the tool $c$. Thus the tool can be clamped vertically to the axis of the lathe, as well as parallel to it, by placing it either in the bore of sleeve $b$ or in the bore of projection $b'$. The lower end of sleeve $b$ is threaded, and a nut $g$ with handle serves to clamp the sleeve fast, as will be easily understood from the drawings. A screw $i$ in the sleeve is provided to clamp the tool in either the bore of the main sleeve or of the lateral sleeve. An ear $d$ projects laterally from the part $a$, having a screw $i'$, which acts against the side sleeve $b'$. Before the nut $g$ is tightened this screw $i'$ is used to determine the exact position of the tool $c$, no matter if inserted in the one or the other of the sleeves, as already stated above. Thus the cutting-edge will always be presented to the work under the same angle, distance, &c.

The sleeve $b'$ is provided with a nipple $e$, Fig. 4, which rests against the lateral surface of carrier $a$, and thus prevents a lateral displacement of the sleeve and tool under the strain of the work.

The differences in height between the slide-rest and the center points of the lathe are adjusted by screws $s\ s'$, resting with their heads upon the slide. It is evident that by screwing one deeper in than the other the carrier $a$ with the tool receives a more or less inclined position.

In changing the tool only the screw $i$ is loosened. The carrier and the other parts remain always on the slide-rest in the same position.

For smaller tools of thin steel wire sleeves may be employed having an outer diameter to fit the bore in $b$ or $b'$.

Having now particularly described the said invention, I declare that what I claim is—

1. A tool rest for lathes composed of a carrier adapted to be secured to the ordinary slide rest, and of a sleeve turning therein, provided with means to clamp it fast in the carrier, and provided with a lateral sleeve, adapted to receive the tool either in the lateral sleeve or in the bore of the main sleeve substantially as described.

2. A tool rest for lathes composed of a carrier adapted to be secured to the ordinary slide rest, and of a sleeve turning therein, provided with means to clamp it fast in the carrier and provided with a lateral sleeve having a nipple on one side, adapted to receive the tool either in the lateral sleeve or in the bore of the main sleeve substantially as described.

3. A tool rest for lathes composed of a carrier adapted to be secured to the ordinary, slide rest, and of a sleeve turning therein, provided with means to clamp it fast, and provided with a lateral sleeve having a nipple on one side, adapted to receive the tool either in the lateral sleeve or in the bore of the main sleeve, said carrier being provided with a projecting ear $d$ with set screw $i'$ bearing upon said lateral sleeve, as and for the purpose specified.

4. A tool rest for lathes composed of a carrier adapted to be secured to the ordinary, slide rest, and of a sleeve turning therein, provided with means to clamp it fast in the carrier and provided with a lateral sleeve having a nipple on one side, adapted to receive the tool either in the lateral sleeve or in the bore of the main sleeve said carrier being provided with a projecting ear $d$ with set screw $i'$ bearing upon said lateral sleeve, and being provided with set screws, the heads of which rest upon the slide rest, substantially as described and illustrated in the drawings.

In testimony whereof I have signed my name to this specification in the presence of two subscribing witnesses.

KARL BAUER.

Witnesses:
 FRANZ ABEL,
 CARL GEHRKE.